United States Patent
Lu et al.

(10) Patent No.: US 9,733,781 B2
(45) Date of Patent: Aug. 15, 2017

(54) DISPLAY DEVICE AND METHOD FOR REALIZING TOUCH SENSING FUNCTION AND NFC FUNCTION

(71) Applicants: Shanghai Tianma Micro-Electronics Co., Ltd., Shanghai (CN); Tianma Micro-Electronics Co., Ltd., Shenzhen (CN)

(72) Inventors: Feng Lu, Shanghai (CN); Jun Ma, Shanghai (CN)

(73) Assignees: Shanghai Tianma Micro-Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 51 days.

(21) Appl. No.: 14/520,258

(22) Filed: Oct. 21, 2014

(65) Prior Publication Data

US 2016/0026276 A1   Jan. 28, 2016

(30) Foreign Application Priority Data

Jul. 23, 2014   (CN) .......................... 2014 1 0352897

(51) Int. Cl.
*G06F 3/046* (2006.01)
*G06F 3/044* (2006.01)

(52) U.S. Cl.
CPC .............. *G06F 3/046* (2013.01); *G06F 3/044* (2013.01)

(58) Field of Classification Search
CPC ..................................................... G06F 3/046
See application file for complete search history.

(56) References Cited

U.S. PATENT DOCUMENTS

| | | | | |
|---|---|---|---|---|
| 2007/0085836 A1* | 4/2007 | Ely | ..................... | G06F 3/03545 345/173 |
| 2008/0238885 A1* | 10/2008 | Zachut | ................ | G06F 3/03545 345/174 |
| 2009/0084612 A1* | 4/2009 | Mattice | ................. | G06F 3/0436 178/18.04 |
| 2010/0265190 A1 | 10/2010 | Rofougaran | | |
| 2010/0267421 A1 | 10/2010 | Rofougaran | | |
| 2011/0267292 A1* | 11/2011 | Yeh | ......................... | G06F 3/046 345/173 |
| 2013/0009895 A1 | 1/2013 | Paulsen | | |
| 2014/0043284 A1* | 2/2014 | Park | ....................... | G06F 3/044 345/174 |
| 2015/0035794 A1* | 2/2015 | Zhitomirskiy | ......... | G06F 3/044 345/174 |

* cited by examiner

*Primary Examiner* — Sanghyuk Park
(74) *Attorney, Agent, or Firm* — Alston & Bird LLP

(57) ABSTRACT

A display device is disclosed. The display device includes a touch driving module, configured to cause the display device to perform a touch sensing function, a communication driving module, configured to cause the display device to perform a Near Field Communication (NFC) function, and a coil circuit. The touch driving module is further configured to receive and send a touch signal via the coil circuit, and the communication driving module is further configured to receive and send an NFC signal via the coil circuit.

23 Claims, 10 Drawing Sheets

DISPLAY DEVICE AND METHOD FOR REALIZING TOUCH SENSING FUNCTION AND NFC FUNCTION

CROSS-REFERENCES TO RELATED APPLICATIONS

This application claims the benefit of priority to Chinese Patent Application No. 201410352897.4, filed with the Chinese Patent Office on Jul. 23, 2014 and entitled "DISPLAY DEVICE AND METHOD FOR DRIVING THE SAME", the content of which is incorporated herein by reference in its entirety.

BACKGROUND OF THE INVENTION

With the development of modern electronic technologies, functions including a Near Field Communication (NFC) function or an electromagnetic touch sensing function can be realized by corresponding components arranged in a display device, to provide convenience in use for users.

In the prior art, a coil circuit is disposed on the back of a display panel in a display device in order to achieve the NFC function, i.e. the coil circuit is configured to receive and send NFC signals. Meanwhile, a further coil circuit is arranged in the display panel in order to achieve the electromagnetic touch sensing function, which is implemented in such a way that: when an electromagnetic pen approaches the display device, a change of current induced in the coil circuit generates a corresponding touch signal, then a touch point is determined by computation based on the obtained touch signal.

BRIEF SUMMARY OF THE INVENTION

One inventive aspect is a display device. The display device includes a touch driving module, configured to cause the display device to perform a touch sensing function, a communication driving module, configured to cause the display device to perform a Near Field Communication (NFC) function, and a coil circuit. The touch driving module is further configured to receive and send a touch signal via the coil circuit, and the communication driving module is further configured to receive and send an NFC signal via the coil circuit.

Another inventive aspect is a method for driving a display device. The display device includes a touch driving module, configured to cause the display device to perform a touch sensing function, a communication driving module, configured to cause the display device to perform a Near Field Communication (NFC) function, and a coil circuit, where the touch driving module are further configured to receive and send a touch signal via the coil circuit and the communication driving module are further configured to receive and send an NFC signal via the coil circuit, respectively. The method includes receiving and sending the touch signal by the touch driving module through the coil circuit to realize the touch sensing function, and receiving and sending the NFC signal by the communication driving module through the coil circuit to realize the NFC function.

BRIEF DESCRIPTION OF THE DRAWINGS

The above and other features, objects, and advantages of the present disclosure will become apparent from the detailed description of the unrestrictive embodiments made below with reference to the accompanying drawings, in which.

DETAILED DESCRIPTION OF THE PREFERRED EMBODIMENTS

The present disclosure will be further described in detail below in conjunction with the accompanying drawings and embodiments. It should understand that the specific embodiments disclosed herein are merely intended for explaining, rather than limiting, the present disclosure. It should also be noted that the accompanying drawings show only parts relating to the present disclosure, but not in an exhausting way, for ease of description.

Figure 1:
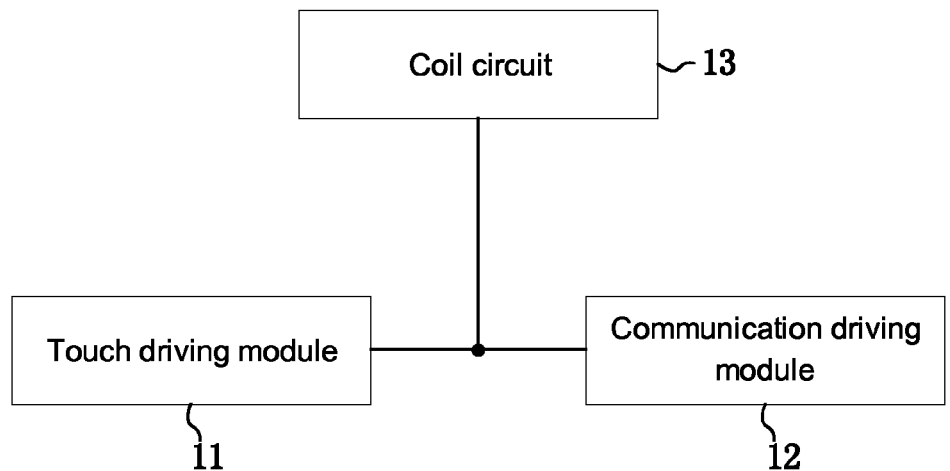
FIG. 1 is a structural block diagram of a display device according to one embodiment of the present disclosure.

One embodiment of the present disclosure provides a display device. FIG. 1 is a structural block diagram of the display device according to this embodiment of the present disclosure. As shown in FIG. 1, the display device includes a touch driving module 11, a communication driving module 12 and a coil circuit 13, where both the touch driving module 11 and the communication driving module 12 share the coil circuit 13 to receive and send a touch signal and an NFC signal, respectively.

It should be noted that the touch driving module 11 is configured to drive the display device to implement a touch sensing function, where the touch driving module 11 can be a touch driving control circuit or a component including the touch driving control circuit in the display device; the communication driving module 12 is configured to drive the display device to implement an NFC function, where the communication driving module 12 can be a communication driving control circuit or a component including the communication driving control circuit in the display device.

It should be further noted that whether the touch driving module 11 sends the touch signal depends on an electromagnetic device (such as an electromagnetic pen) external to the display device. Particularly, if the electromagnetic device is an active electromagnetic device (such as an active electromagnetic pen) which can automatically generate an electromagnetic signal without need for charging, thus the touch driving module 11 is not required to send the touch signal (which is an electromagnetic signal does not include any data information, and is used to charge a passive electromagnetic device) through the coil circuit 13. If the electromagnetic device is an passive electromagnetic device (such as a passive electromagnetic pen), the electromagnetic device needs to be charged firstly because it cannot automatically generate an electromagnetic signal, thus the touch driving module 11 is required to send the touch signal through the coil circuit 13, and the touch signal is used to charge the passive electromagnetic device. In embodiments of the present disclosure, the electromagnetic device outside the display device is generally regarded as a passive electromagnetic device if the touch driving module 11 is configured to send the touch signal through the coil circuit 13.

The display device also includes other components in addition to the above touch driving module 11, the communication driving module 12 and the coil circuit 13. For example, if the display device is a Liquid Crystal Display (LCD) device, the display device further includes a color filter substrate, an array substrate disposed opposite to the color filter substrate, a liquid crystal layer arranged between the color filter substrate and the array substrate, a driving control circuit configured to drive the display device to implement a display function, and so on. In order for a better touch effect and a better NFC effect, preferably, the coil circuit 13 can be disposed at one side of the color filter substrate away from the liquid crystal layer.

In this embodiment, both the touch driving module 11 and the communication driving module 12 share the common coil circuit 13 in the display device to receive and send the touch signal and the NFC signal, respectively. Compared with the prior art in which the display device receives and sends the touch signal and the NFC signal through two respective coil circuits, the present disclosure decreases the structural complexity of the display device reduces the occupied inner space of the display device, and reduces the fabrication cost of the display device.

Figure 2A:
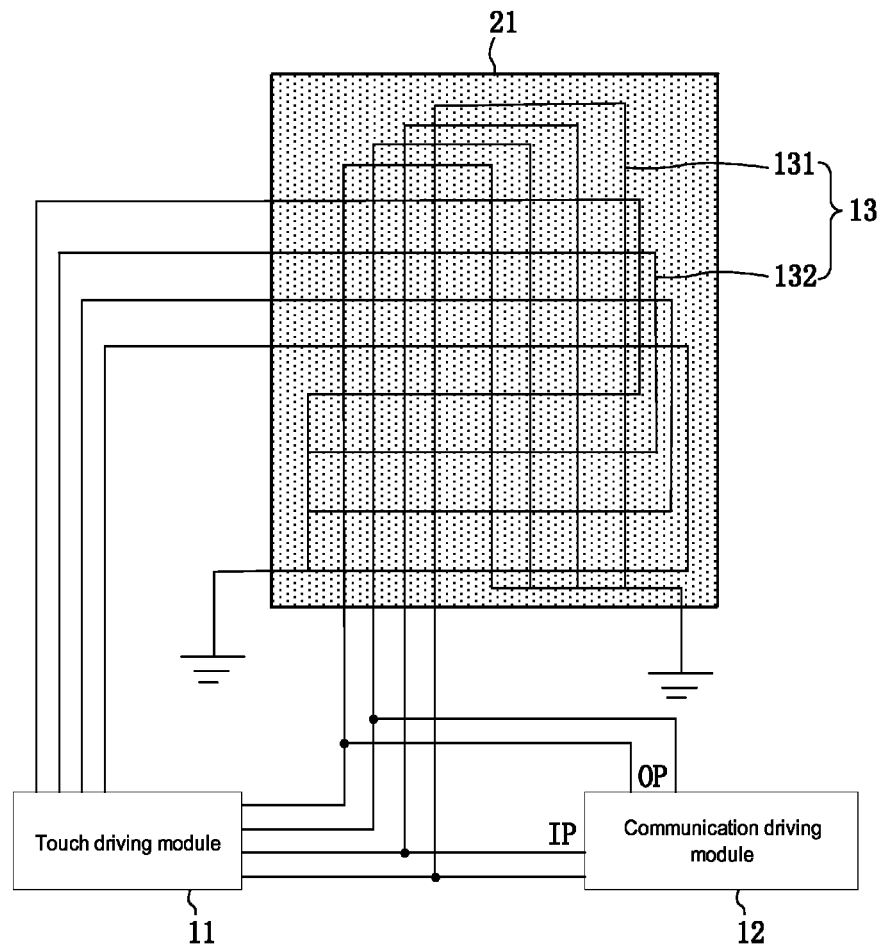
FIG. 2A is a schematic view showing electrical connections of a touch driving module and a communication driving module to a coil circuit in the display device, according to another embodiment of the present disclosure.
Figure 2B:
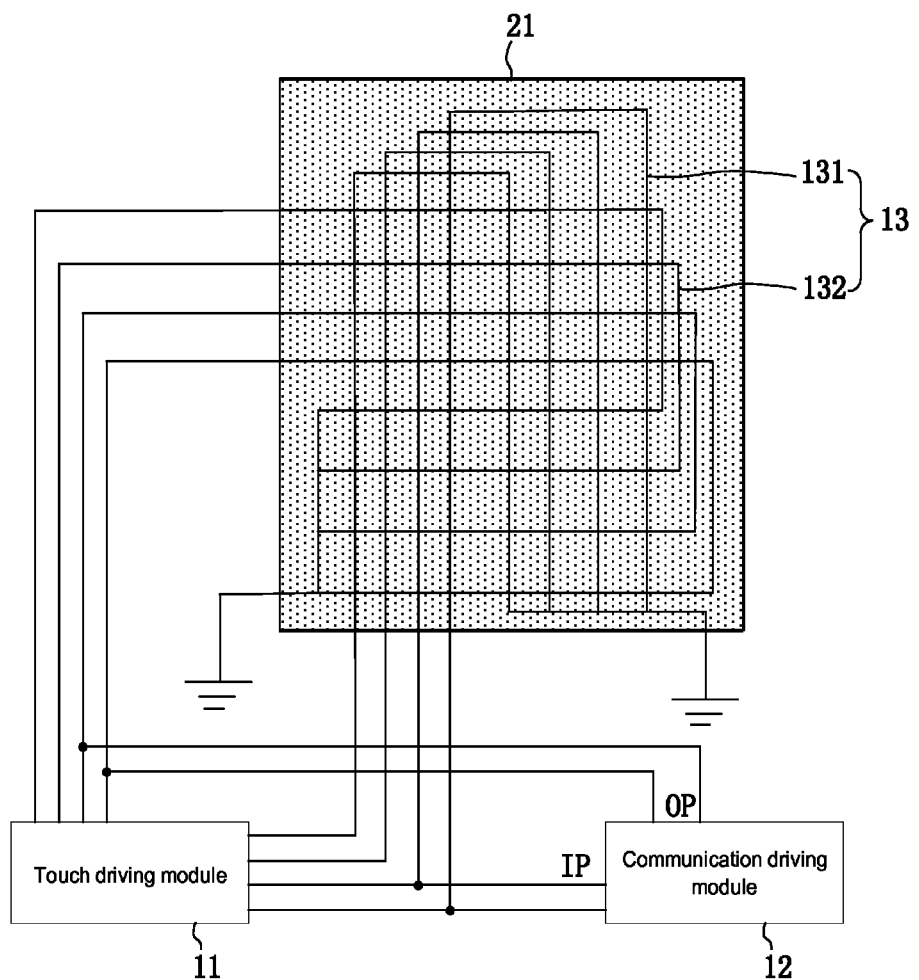
FIG. 2B is a schematic view showing electrical connections of a touch driving module and a communication driving module to a coil circuit in another display device, according to another embodiment of the present disclosure.

Further, the coil circuit 13 can include a first oriented coil circuit and a second oriented coil circuit which intersects with and is electrically insulated from the first oriented coil circuit; both the first oriented coil circuit and the second oriented coil circuit are electrically connected with the touch driving module 11; a part of all of the first oriented coil circuits and/or the second coil circuits are electrically connected with the communication driving module 12. FIG. 2A is a schematic view showing electrical connections of a touch driving module and a communication driving module to a coil circuit in the display device according to this embodiment of the present disclosure. FIG. 2B is a schematic view showing electrical connections of a touch driving module and a communication driving module to a coil circuit in another display device according to this embodiment of the present disclosure. Referring to FIGS. 2A and 2B, the coil circuits 13 are disposed on a touch panel 21 of the display device and include first oriented coil circuits 131 and second oriented coil circuits 132 which intersect with and are electrically insulated from the first oriented coil circuits 131, and both the first oriented coil circuits 131 and the second oriented coil circuits 132 are electrically connected with the touch driving module 11. As shown in FIG. 2A, all of the first oriented coil circuits 131 are electrically connected with the communication driving module 12, but as shown in FIG. 2B, the first oriented coil circuits 131 are partially electrically connected with the communication driving module 12 and the second oriented coil circuits 132 are partially electrically connected with the communication driving module 12.

Referring to FIG. 2A or FIG. 2B, preferably, the first oriented coil circuits 131 perpendicularly intersect and are electrically insulated from the second oriented coil circuits 132, thus a Cartesian coordinate system is formed by the first orientation and the second orientation, so that the location of a touch point can be more easily calculated when the display device is touched, thereby increasing the response speed of the touch, compared with the case that the first orientation is not perpendicular to the second orientation.

Referring to FIG. 2A, preferably, both input terminals IP and output terminals OP of the communication driving module 12 are electrically connected with the coil circuits 13 in the same orientation (e.g. the first oriented coil circuits 131 as shown in FIG. 2A), thus the amount of wirings in the display device and the structural complexity of the display device can be reduced by such arrangement of the coil circuits for the NFC function, thereby decreasing the power consumption of the display device. Or, referring to FIG. 2B, preferably, the input terminals IP of the communication driving module 12 are electrically connected with the coil circuits in one orientation (e.g. the first oriented coil circuits 131 as shown in FIG. 2B), and the output terminals OP of the communication driving module 12 are electrically connected with the coil circuits in the other orientation (e.g. the second oriented coil circuits 132 as shown in FIG. 2B), so that the structural complexity of the display device is reduced and the switch time between output and input operations of the communication driving module is also shortened by such arrangement of the coil circuits for the NFC function, thereby increasing the response speed of NFC.

In this embodiment, referring to FIG. 2A or 2B, preferably, the coil circuit 13 is an electromagnetic touch sensing coil circuit. Alternatively, the coil circuit 13 may be an electromagnetism and capacitance integrated touch coil circuit or a coil circuit grounded in capacitive touch sensing. The electromagnetism and capacitance integrated touch coil circuit may be embodied by the electromagnetic touch sensing coil circuit in an electromagnetism and capacitance integrated touch structure, thus the operation principle of this electromagnetism and capacitance integrated touch coil circuit is similar to that of the coil circuit in FIG. 2A or 2B, that is, the electromagnetism and capacitance integrated touch coil circuit is used to implement the touch sensing function and the NFC function, respectively, and electromagnetism and capacitance integrated touch structure can be provided at the side of the color filter substrate in the display device or can be provided at the side of the TFT array substrate. The coil circuit grounded in capacitive touch sensing is such that, under the control of the corresponding control circuit, it is grounded to have a ground potential when the capacitive touch sensing function is being performed by the display device, thus the touch electrode in the capacitive touch structure is electrostatically shielded; when the capacitive touch sensing function is not performed by the display device, the coil circuit grounded in capacitive touch sensing can be electrically connected with the touch driving module and the communication driving module for realizing the touch sensing function and the NFC function, respectively.

With the display device provided in this embodiment, both the touch driving module and the communication driving module share the same coil circuit to receive and send the touch signal and the NFC signal, respectively, thereby reducing the structural complexity and the fabrication cost of the display device.

Figure 3:
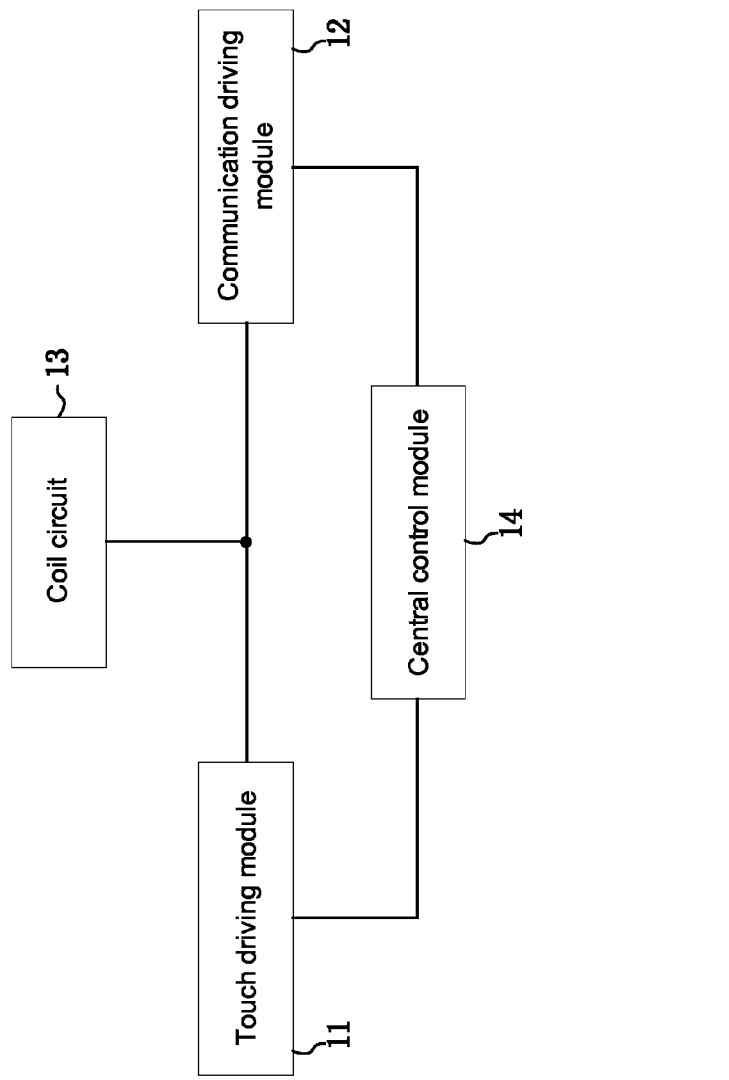
FIG. 3 is a structural block diagram of another display device according to another embodiment of the present disclosure.

FIG. 3 is a structural block diagram of another display device according to another embodiment of the present disclosure. Based on the display device provided in the above first embodiment, referring to FIG. 3, the display device further includes a central control module 14, which is configured to control the touch driving module 11 and the communication driving module 12 to receive and send signals through the coil circuit 13, respectively, in order to realize the touch sensing function and the NFC function. In FIG. 3, the central control module 14 is electrically connected with the touch driving module 11 and the communication driving module 12, respectively, to control the touch driving module 11 and the communication driving module 12. For example, the central control module 14 may send a touch sensing transmission request signal to the touch driving module 11 to instruct the touch driving module 11 to perform the touch sensing function, or the central control module 14 may send an NFC transmission request signal to the communication driving module 12 to instruct the communication driving module 12 to perform the NFC function, or the central control module 14 may send a corresponding suspending signal to the touch driving module 11 or the communication driving module 12 to suspend the corresponding function being performed. Moreover, to send signals, the central control module 14 firstly sends the corresponding data to the communication driving module 12 by which the corresponding data is sent out in an NFC signal form; and to receive signals, the touch signal and the NFC signal respectively received by the touch driving module 11 and the communication driving module 12 are sent to the central control module 14, which processes the corresponding received signals. The central control module 14 can be a Central processing Unit (CPU) in the display device, or a component including the CPU in the display device, or other components with the same function in the display device as that of the CPU.

Further, to send an NFC signal, an NFC transmission request signal is generated by the central control module and then is delivered to the communication driving module; and to receive an NFC signal, an NFC receiving request signal is generated by the communication driving module and then is delivered to the central control module.

The display device based on the above principle may be embodied in various manners, for example, the touch driving module and the communication driving module may send and receive the touch signal and the NFC signal, respectively, via the coil circuit in a time division manner or a simultaneous manner, and preferable embodiments are described in detail as follows.

Another embodiment of the present disclosure further provides a display device, in which the touch driving module and the communication driving module are configured to share the same coil circuit in a time division manner for sending and receiving a touch signal and an NFC signal, respectively. The structure of the display device provided in this embodiment is the same as that of the display device shown in FIG. 3 which corresponds to the embodiment mentioned above. Referring to FIG. 3, on the basis of the embodiment mentioned above, as shown in FIG. 3, the central control module 14 in this embodiment is further configured to control the touch driving module 11 and the communication driving module 12 to send and receive the touch signal and the NFC signal, respectively, through the coil circuit in the time division manner, to implement the touch sensing function and the NFC function in the time division manner.

In the display device, the touch sensing function and the NFC function are performed in the time division manner by the touch driving module 11 and the communication driving module 12 under the control of the central control module 14, that is, under such operation mode, receiving and sending the touch signal is not performed simultaneously with receiving and sending the NFC signal. However, in the prior art, the touch sensing function and the NFC function of the display device are realized through two separate coil circuits, respectively, and the touch sensing function and the NFC function might be performed simultaneously in similar communication principles, therefore an electromagnetic interference can be generated when the receiving or sending of the touch signal is simultaneously with the receiving or sending of the NFC signal. In this embodiment, the touch sensing function and the NFC function are realized in the time division manner, so that the electromagnetic interference between the touch signal and the NFC signal is avoided, thereby increasing the accuracy and precision of receiving and sending the touch signal and the NFC signal.

As described above, considering that the above touch sensing function and the NFC function are realized in the time division manner, the display device may operate in two operation modes corresponding to the touch sensing function and the NFC function, i.e. a first operation mode and a second operation mode, where in the first operation mode, the display device mainly performs the touch sensing function, but stop performing the touch sensing function to start the NFC function in a need for the NFC function; and in the second operation mode, the display device mainly performs the NFC function, but stop performing the NFC function to start the touch sensing function in a need for the touch sensing function. Because these two operation modes are similar with each other, the first operation mode is taken as an illustrative implementation to further describe the embodiments of the present disclosure.

In this embodiment, according to the time division manner, the touch driving module 11 scans the coil circuit 13 in a first frequency to detect whether a touch signal exists in the coil circuit 13, and the communication driving module 12 scans the coil circuit 13 in a second frequency to detect whether an NFC signal exists in the coil circuit 13, where the first frequency is higher than the second frequency. It should be noted that scanning the coil circuit 13 in the second frequency by the communication driving module 12 corresponds to the reception of an NFC signal by the display device, and is not involved in sending the NFC signal. Likewise, scanning the coil circuit 13 in the first frequency by the touch driving module 11 corresponds to the reception of a touch signal by the display device. If the electromagnetic device outside the display device is a passive electromagnetic device (such as a passive electromagnetic pen), the touch driving module 11 may also apply a touch signal (which is an electromagnetic signal does not include any data information, and is used to charge the passive electromagnetic device) to the coil circuit 13 when scanning the coil circuit 13, and the touch signal is then sent to the passive electromagnetic device via the coil circuit 13 to charge the passive electromagnetic device.

Particularly, the touch driving module 11 scans the coil circuit 13 in the first frequency to detected whether a touch signal exists in the coil circuit 13 in such a way that: the touch driving module 11 scans the coil circuit 13 in the first frequency to detected whether a touch signal generated by the electromagnetic device (such as the electromagnetic pen) outside the display device exists in the coil circuit 13, if so, the touch driving module 11 sends a touch receiving request signal to the central control module 14, and starts to receive the touch signal from the coil circuit 13, and then sends the received touch signal to the central control module 14 for further processing. The communication driving module 12 scans the coil circuit 13 in the second frequency to detect whether an NFC signal exists in the coil circuit 13 in such a way that: the communication driving module 12 scans the coil circuit 13 in the second frequency to detect whether an NFC signal generated by an NFC device (such as a mobile phone, a Tablet PC or an electromagnetic card with the NFC function) outside the display device exists in the coil circuit 13, if so, the communication driving module 12 sends an NFC receiving request signal to the central control module 14 and starts to receive the NFC signal from the coil circuit 13, then sends the received NFC signal to the central control module 14 for further processing.

It should be noted that if the electromagnetic device generating the touch signal outside the display device is an electromagnetic pen, scanning the coil circuit 13 in the first frequency by the touch driving module 11 to detect whether the touch signal exists in the coil circuit 13 may vary depending on whether the electromagnetic pen is an active electromagnetic pen or a passive electromagnetic pen. That is, if the electromagnetic pen is an active electromagnetic pen which automatically generates an electromagnetic signal, and a touch signal is generated in the coil circuit 13 of the display device when the active electromagnetic pen approaches or contacts the display device, the touch signal is detected through scanning the coil circuit 13 by the touch driving module 11. If the electromagnetic pen is a passive electromagnetic pen which cannot automatically generate a touch signal, and when the passive electromagnetic pen is in an uncharged state, a touch signal will not be generated in the coil circuit 13 when the passive electromagnetic pen approaches or contacts the display device, in this case, the touch driving module 11 applies a touch signal for charging the passive electromagnetic pen (which is an electromagnetic signal does not include any data information, and is used to charge the passive electromagnetic device) to the coil circuit 13 when scanning the coil circuit 13 in the first frequency, thus, the passive electromagnetic pen is charged when receiving the touch signal sent from the display device, to generate an electromagnetic signal, thus the corresponding touch signal is detected through scanning the coil circuit 13 by the touch driving module 11 when the passive electromagnetic pen approaches or contacts the display device.

In scanning the coil circuit 13 as above, if the first frequency used for scanning the coil circuit 13 by the touch driving module 11 is higher than the second frequency used for scanning the coil circuit 13 by the communication driving module 12, the display device operates in the first operation mode. For example, the first frequency can be 100 Hz and the second frequency can be 40 Hz, it can be understood that: the touch driving module 11 scans the coil circuit 13 for 100 times per second, and the communication driving module 12 scans the coil circuit 13 for 40 times per second. In a certain design, the first frequency and the second frequency can be set as actually desired.

If the display device performs the touch sensing function and the NFC function in the above first operation mode, the first frequency is preferably 19 or more times as large as the second frequency, to further ensure that the display device preliminarily performs the touch sensing function and performs the touch sensing function and the NFC function in the first operation mode.

In this embodiment, further, when the NFC transmission request signal is generated by the central control module 14, the receiving and sending of a touch signal by the touch driving module 11 is terminated, the communication driving module is caused to send the NFC signal through the coil circuit 13, and after the sending of the NFC signal is completed, the touch sensing function of the touch driving module 11 performed through the coil circuit 13 is resumed. When the NFC receiving request signal is received by the central control module 14, the receiving and sending of a touch signal by the touch driving module 11 is terminated, the communication driving module 12 is caused to receive the NFC signal through the coil circuit 13, and after the receiving of the NFC signal is completed, the touch sensing function of the touch driving module 11 performed through the coil circuit 13 is resumed. When the central control module 14 neither generates the NFC transmission request signal nor receives the NFC receiving request signal, the touch driving module 11 is kept to continuously perform the touch sensing function through the coil circuit 13.

It should be noted that, during the operation of the display device, modules in the display device are powered, but the display device is at a standby state when the touch sensing and NFC functions are not performed. In view of this, when the NFC receiving request signal is generated by the central control module 14, the central control module 14 stops the receiving and sending of a touch signal by the touch driving module, and sends the NFC receiving request signal to communication driving module 12; after receiving the NFC receiving request signal, the communication driving module 12 automatically sends the NFC signal through the coil circuit 13, and after the NFC signal is completely sent, the communication driving module 12 sends a completion report signal to the central control module 14 and then enters a standby state; after receiving the completion report signal from the communication driving module 12, the central control module 14 causes the touch driving module 11 to resume the touch sensing function performed through the coil circuit 13. A process of receiving signals is similar to that of sending signals as above and will not be described herein.

On the basis of the embodiment mentioned above, as shown in FIG. 1, the central control module of the display device provided in this embodiment controls the touch driving module and the communication driving module to receive and send the respective signals through the coil circuit in a time division manner, for realizing the touch sensing function and the NFC function, so that the electromagnetic interference between the touch signal and the NFC signal is avoided, thereby increasing the accuracy and the precision of receiving and sending the touch signal and the NFC signal.

Another embodiment of the present disclosure further provides a display device, which enables the touch driving module and the communication driving module to share a coil circuit for sending and receiving a touch signal and an NFC signal, respectively, in a simultaneous manner. It should be noted that the simultaneous manner is such that: when the touch driving module sends the touch signal through the coil circuit, the communication driving module may also simultaneously send the NFC signal through the coil circuit; and when the touch driving module receives the touch signal through the coil circuit, the communication driving module may also simultaneously receive the NFC signal through the coil circuit. As such, in the simultaneous manner, the central control module 14 in FIG. 3 is also configured to control the touch driving module and the communication driving module to receive and send the touch signal and the NFC signal, respectively, through the coil circuit, for realizing the touch sensing function and the NFC function simultaneously.

In this embodiment, further, when an NFC transmission request signal is generated by the central control module 14, the central control module 14 controls the touch driving module 11 to continue receiving and sending the touch signal through the coil circuit 13, and controls the communication driving module 12 to send the NFC signal through the coil circuit 13; when an NFC receiving request signal is received by the central control module 14, the central control module 14 controls the touch driving module 11 to continue receiving and sending the touch signal through the coil circuit 13, and controls the communication driving module 12 to receive the NFC signal through the coil circuit 13; and when the central control module 14 neither generates the NFC transmission request signal nor receives the NFC receiving request signal, the touch driving module 11 is kept to continuously perform the touch sensing function through the coil circuit 13.

It should be noted that, during the operation of the display device, modules in the display device are powered, but the display device is at a standby state when the touch sensing and NFC functions are not performed. In view of this, when the NFC transmission request signal is generated by the central control module 14, the touch driving module 11 is kept to continue receiving and sending the touch signal through the coil circuit 13, and the NFC transmission request signal is sent to the communication driving module 12 by the central control module 14; after receiving the NFC transmission request signal, the communication driving module 12 automatically sends the NFC signal through the coil circuit 13, so that both the touch signal and the NFC signal are sent simultaneously through the coil circuit. The process for receiving the signal is similar to the process for sending the signal as above and will not be described again herein.

Figure 4A:
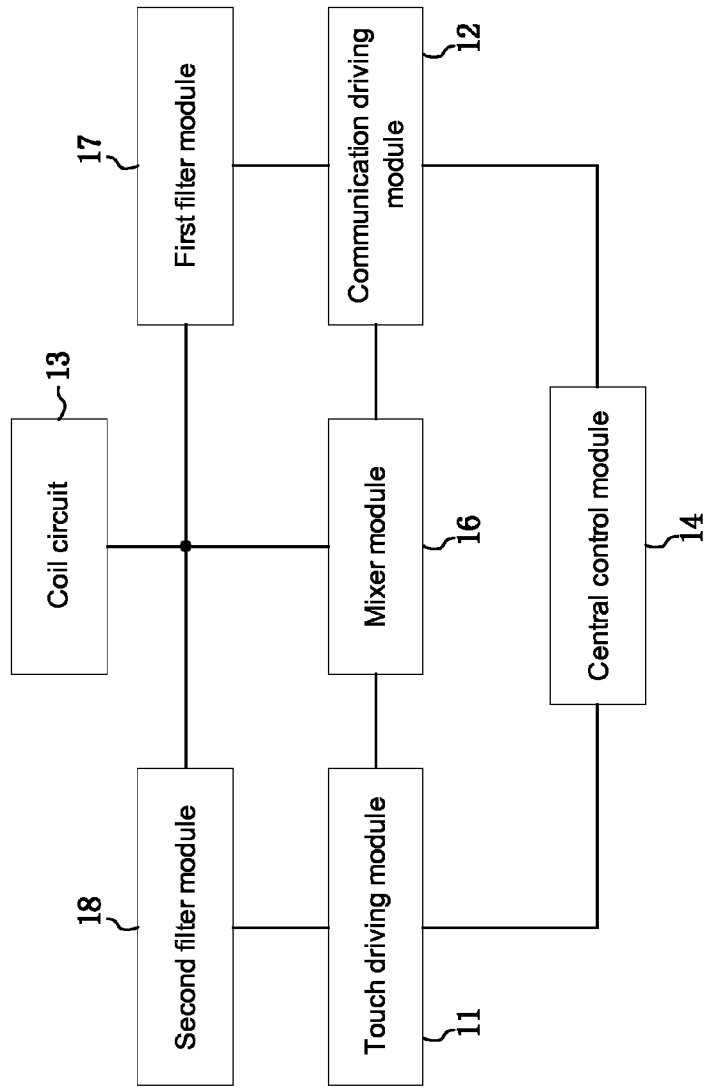
FIG. 4A is a structural block diagram of a display device according to another embodiment of the present disclosure.

In order for a better effect of receiving and sending signals in the simultaneous manner in this embodiment, one or more modules can be further introduced to the display device in FIG. 3. FIG. 4A is a structural block diagram of the display device according to this embodiment of the present disclosure. Referring to FIGS. 3 and 4A, based on another embodiment of the present disclosure, the display further in this embodiment further includes a mixer module 16. Before a signal is sent from the display device, the mixer module 16 mixes a sending touch signal and a sending NFC signal together to generate a mixed signal and applies the mixed signal to the coil circuit 13.

It should be noted that the frequency of the NFC signal is about 13.56 MHz, and the frequency of the touch signal is about 300 KHz to 500 KHz. Due to the difference between the frequency of the NFC signal and the frequency of the touch signal, these two signals are required to be mixed to generate a mixed signal for sending so that these two signals are sent through the coil circuit 13 simultaneously, and this process of generating the mixed signal can be accomplished by a mixer module 16 in this embodiment. In the prior art, however, the touch sensing function and the NFC function of the display device are realized through two separate coil circuits, respectively, thus a sending touch signal and a sending NFC signal might be sent out simultaneously, as a result, an electromagnetic interference may be caused when the sending touch signal and the sending NFC signal are sent simultaneously, due to the similar communication principles of the sending touch signal and the sending NFC signal. Although the touch sensing function and the NFC function are realized simultaneously in this embodiment, the sending touch signal and the sending NFC signal are mixed with each other before they are sent out, to generate a mixed signal, thereby avoiding the electromagnetic interference between the sending touch signal and the sending NFC signal and improving the accuracy and the precision of the sending touch signal and the sending NFC signal.

Further, referring to FIG. 4A, the display device also includes a first filter module 17. When a signal (e.g. a mixed signal) is received by the display device, the received mixed signal is subjected to high-pass filtering of the filter module 17 to obtain a received NFC signal, which then is sent to the communication driving module 12; additionally, the received mixed signal is sent to the touch driving module 11 as the received touch signal. It should be noted that, because the frequency of the touch signal is different from that of the NFC signal, e.g. the frequency of the touch signal is lower than that of the NFC signal, to prevent the touch signal with a lower frequency from interfering with the NFC signal when the mixed signal is received, the received mixed signal is required to be subjected to high-pass filtering of the first filter module 17, to obtain the received NFC signal by filtering out the touch signal with the lower frequency in the mixed signal, and then the obtained received NFC signal is sent to the communication driving module 12. Whereas, the NFC signal with the higher frequency has little interference with the touch signal, thus the mixed signal as received can be directly sent to the touch driving module 11 as the received touch signal. As such, with the first filter module 17 arranged in the display device, when a signal is received, the electromagnetic interference caused by the touch signal on the NFC signal can be avoid, and the accuracy and the precision of the received NFC signal received by the communication driving module 12 is increased in comparison with the prior art.

In this embodiment, referring to FIG. 4, the display device preferably further includes a second filter module 18. When a signal (e.g. a mixed signal) is received by the display device, the received mixed signal is subjected to low-pass filtering by the second filter module 18 to obtain a received touch signal which is then sent to the touch driving module 11. As such, although the NFC signal with a higher frequency causes merely little interference with the touch signal, the received mixed signal is subjected to low-pass filtering by the second filter module 18 to filter out the NFC signal with the higher frequency from the mixed signal, to obtain a resultant received touch signal which is then sent to the touch driving module 11, in order to improve the accuracy and the precision of the received touch signal as received by the touch driving module 11.

Figure 4B:
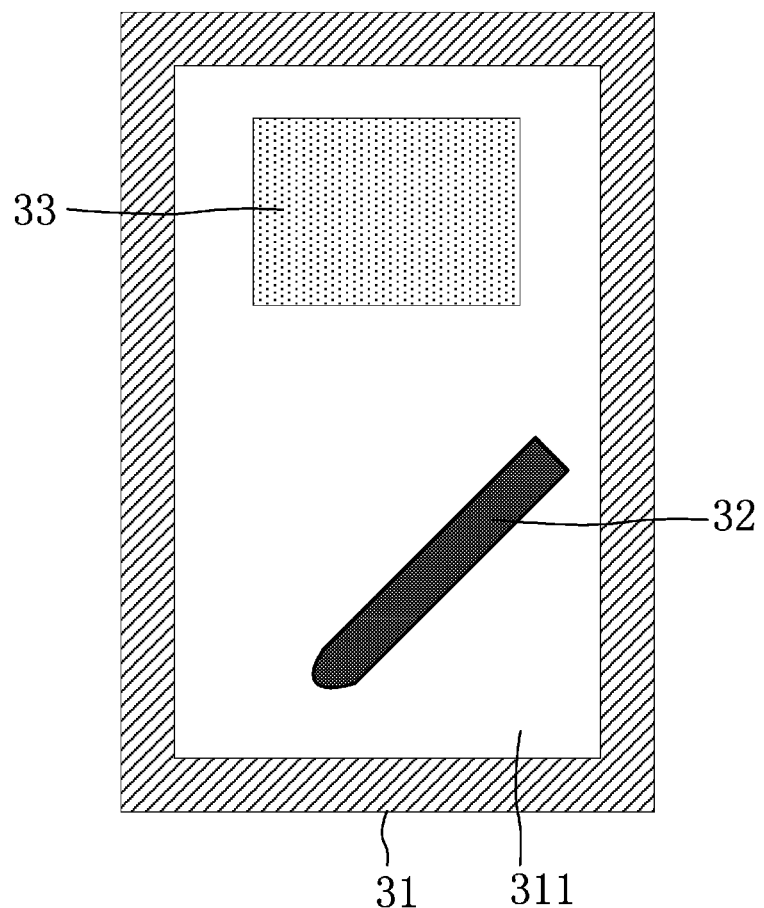
FIG. 4B is a schematic diagram of a display device performing a touch sensing function and an NFC function simultaneously.

FIG. 4B is a schematic equivalent diagram of the display device performing the touch sensing function and the NFC function simultaneously. As shown in FIG. 4B, an electromagnetic pen 32 and an electromagnetic card 33 are contacting a surface of a display region 311 in the display device 31, where the electromagnetic pen 32 can be an active or passive electromagnetic pen, and the electromagnetic card 33 can be a bank card, a credit card or an identification card with the NFC function. In this case, the display device performs the touch sensing function and the NFC function in the simultaneous manner.

In the display device provided in this embodiment, the touch driving module and communication driving module share the same coil circuit to receive and send the touch signal and the NFC signal, respectively, in the simultaneous manner, and the electromagnetic interference between the touch signal and the NFC signal caused in receiving and sending the signals can be avoided through the corresponding modules arranged in the display device, thereby increasing the accuracy and the precision of the touch signal and the NFC signal received and sent.

Another embodiment of the present disclosure provides a method for driving the display device, and the method can be performed by the display device described in the embodiment mentioned above, as shown in FIG. 3, thus reference may be made to the above embodiment which is shown in FIG. 3 for the description of the related working principles and explanation and illustration of the related concepts, which will not be described in detail herein again.

Figure 5:
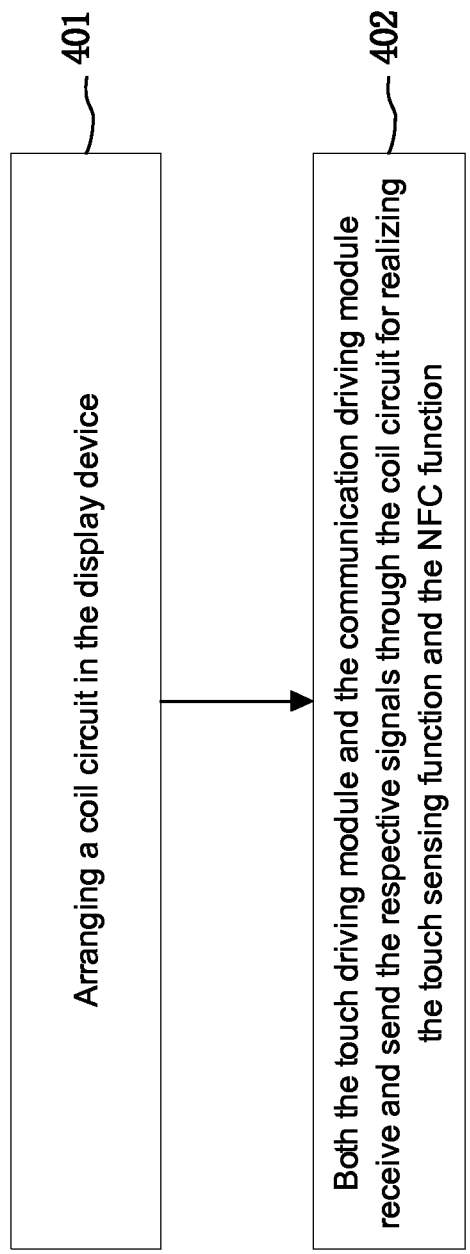
FIG. 5 is a schematic flow chart showing a method for driving a display device according to another embodiment of the present disclosure.

FIG. 5 is a schematic flow chart showing a method of driving a display device according to this embodiment of the present disclosure. As shown in FIG. 5, the method for driving the display device includes the following steps of:

Step 401: arranging a coil circuit in the display device; and

Step 402: receiving and sending a touch signal and an NFC signal, by the touch driving module and the communication driving module respectively through the coil circuit for respectively realizing the touch sensing function and the NFC function.

With the method for driving the display device in this embodiment, the touch driving module and the communication driving module respectively realize the touch sensing function and the NFC function through the coil circuit arranged in the display device, so that the structural complexity of the display device and the fabrication cost of the display device can be reduced.

In this embodiment, the display device further includes a central control module, which is configured to control the touch driving module and the communication driving module to receive and send signals through the coil circuit, respectively, in order to realize the touch sensing function and the NFC function.

Further, to send the NFC signal, the central control module generates an NFC transmission request signal and sends the same to the communication driving module; when the NFC signal is received, the communication driving module generates an NFC receiving request signal and then sends the same to the central control module.

The method for driving the display device based on the above principle can be implemented in various specific ways, for example, the touch driving module and the communication driving module may share the coil circuit in a time division manner or a simultaneous manner to receive and send the respective signals. Hereinafter, the preferable embodiment is taken as an example for further explaining the implementation of the touch sensing function and the NFC function in the time division manner or the simultaneous manner.

A method for driving a display device provided in the present embodiment may be performed by the display device in the embodiment mentioned above, as shown in FIG. 3, thus reference may be made to the description of the embodiment mentioned above, as shown in FIG. 3 for the description of the related working principles and the explanation and illustration of the related concepts, which will not be described again in detail herein. The time division manner is employed in the present embodiment on the basis of the embodiment mentioned above, as shown in FIG. 5, that is, the touch driving module and the communication driving module receive and send the touch signal and the NFC signal, respectively, through the coil circuit in the time division manner.

As described above, as the above two functions (i.e. the touch sensing function and the NFC function) are realized in the time division manner, correspondingly, the display device has two operation states corresponding to these two functions, i.e. a first operation state and a second operation state, where in the first operation state, the display device preliminarily performs the touch sensing function, and when the NFC function is required to be performed by the display device, the touch sensing function is suspended and the NFC function is performed; and in the second operation state, the display device preliminarily performs the NFC function, and when the touch sensing function is required to be performed by the display device, the NFC function is suspended and the touch sensing function is performed. Since these two operation states are similar with each other, the implementation of the first operation state described as an example to further describe the present disclosure.

In this embodiment, the touch sensing function and the function are realized in the time division manner. Preferably, the touch driving module scans the coil circuit in a first frequency to detect whether a touch signal exists in the coil circuit, and the communication driving module scans the coil circuit in a second frequency to detect whether an NFC signal exists in the coil circuit, where the first frequency is higher than the second frequency. Further, the first frequency is preferably 19 or more times as large as the second frequency. Reference may be made to the embodiment mentioned above, as shown in FIG. 3 for the explanation and description here, which will not be described again in detail.

Further, in this embodiment, the implementation of the touch sensing function and the NFC function in the time division manner includes that: when generating an NFC transmission request signal, the central control module stops the receiving and sending of the touch signal by the touch driving module, controls the communication driving module to send the NFC signal through the coil circuit, and after the NFC signal is sent, resumes the touch sensing function performed by the touch driving module through the coil circuit; when receiving an NFC receiving request signal, the central control module stops the receiving and sending of the touch signal by the touch driving module, controls the communication driving module to receive the NFC signal through the coil circuit, and after the NFC signal is received, resume the touch sensing function performed by the touch driving module through the coil circuit; and when the central control module neither generates the NFC transmission request signal nor receives the NFC receiving request signal, the touch driving module is kept to continuously perform the touch sensing function through the coil circuit.

A specific implementation is taken as an example for further explaining the operation principle of the time division manner.

Figure 6:
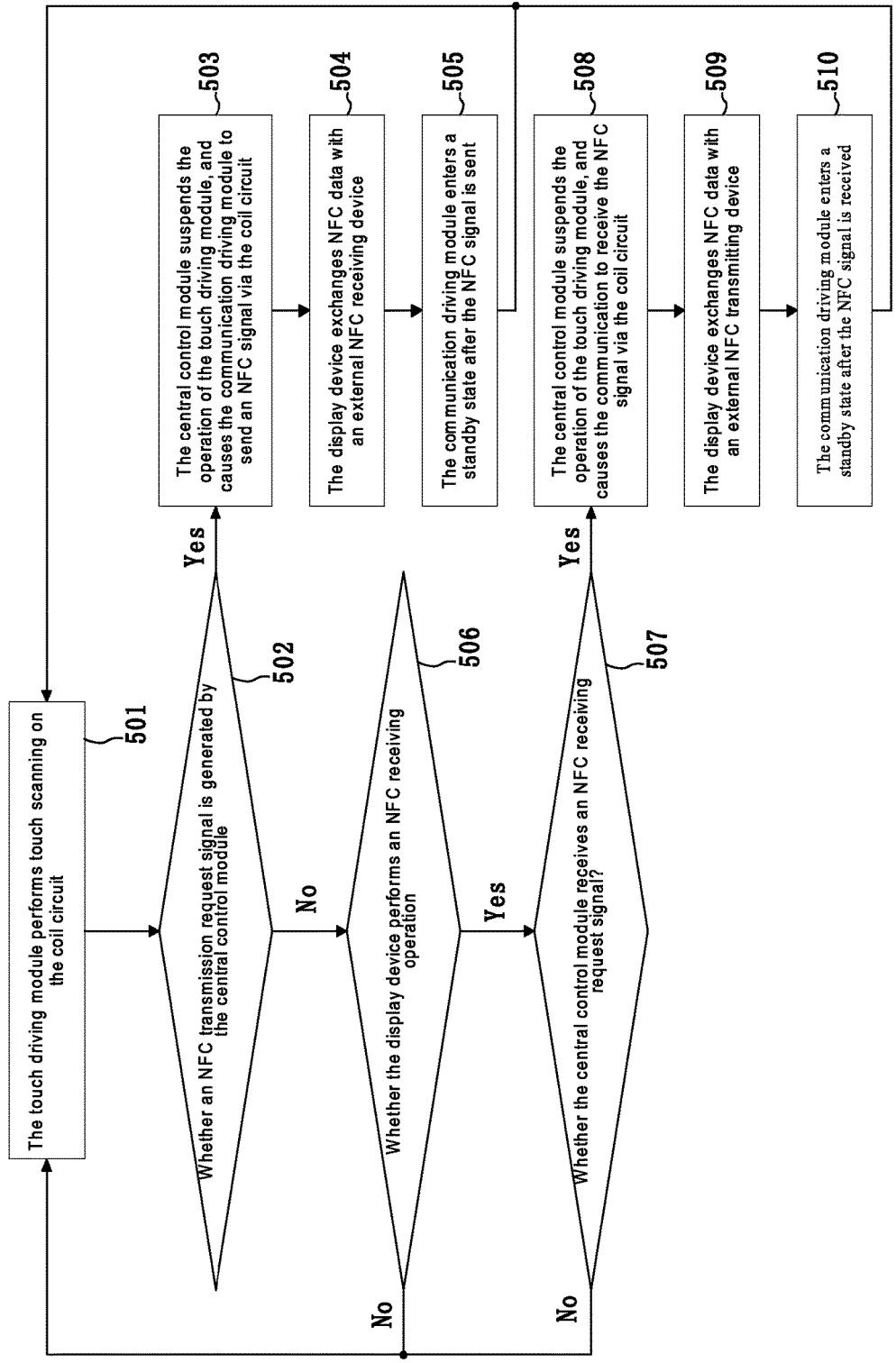
FIG. 6 a schematic flow chart showing a method for driving a display device according to another embodiment of the present disclosure, where the method is implemented in a time division manner.

FIG. 6 a schematic flow chart showing a method for driving a display device according to another embodiment of the present disclosure, where the method is operated in a time division manner. Referring to FIG. 6, the method for driving the display device includes the following Steps 501 to 510.

Step 501: the touch driving module scans the coil circuit.

Step 502, it is determined whether the central control module generates an NFC transmission request signal.

It should be noted that the schematic flow chart of the method for driving a display device in FIG. 6 illustratively shows an example that the display device works in the first operation mode, that is, the display device preliminarily performs the touch sensing function and occasionally performs the NFC function.

In this step, if the central control module generates the NFC transmission request signal, then Step 503 is proceeded with, otherwise Step 506 is executed.

Step 503: the central control module suspends the operation of the touch driving module and controls the communication driving module to send the NFC signal through the coil circuit.

Step 504: the display device exchanges NFC data with an external NFC receiving device.

It should be noted that the external NFC receiving device can be a mobile phone, a Tablet PC or an electromagnetic card with and so on the NFC function.

Step 505: the communication driving module enters to a standby state after the NFC signal is sent.

In this embodiment, if Step 504 is finished, the method proceeds with Step 501 to repeat the above steps.

Step 506: it is determined whether the display device performs the NFC receiving operation.

It should be noted that this step can be realized through scanning the coil circuit by the communication driving module. If an NFC signal sent from outside of the display device is detected by scanning the coil circuit by the communication driving module, it is indicated that the display device is required to perform an NFC receiving operation, otherwise the display device is not required to perform the NFC operation.

In this step, if the display device is required to perform the NFC receiving operation, Step 507 is executed, or the method returns to Step 501.

Step 507: it is determined whether the central control module receives an NFC receiving request signal.

As can be seen from the above, if the NFC signal sent outside of the display device is detected by the communication driving module in scanning the coil circuit, the NFC receiving request signal is generated by the communication driving module and then is sent to the central control module.

In this step, if the NFC receiving request signal is received by the central control module, then Step 508 is executed, or the method returns to Step 501.

Step 508: the central control module suspends the touch sensing function of the touch driving module and controls the communication driving module to receive the NFC signal through the coil circuit.

Step 509: the display device exchanges the NFC data with an external NFC transmitting device.

It should be noted that the external NFC transmitting device can be a mobile phone, a Tablet PC or a laptop with the NFC function.

Step 510: the communication driving module enters to a standby state after the NFC signal is received.

In this embodiment, after this step is completed, the method returns to Step 501, and the above steps are repeated.

According to the method for driving the display device in this embodiment of the present disclosure, the touch signal and the NFC signal are received and sent through the coil circuit in the time division manner, to avoid the electromagnetic interference between the touch signal and the NFC signal when the signals are received or sent, thereby the accuracy and the precision of receiving and sending the touch signal and NFC signal are increased.

A method for driving the display device is provided in this embodiment and may be performed by the display device provided in the embodiment mentioned above, as shown in FIG. 4A, and reference may be made to the above embodiment which is shown in FIG. 5 for the description of the related working principles and explanation and illustration of the related concepts, which will not be described again therein. A simultaneous manner is adapted by this embodiment based on the embodiment mentioned above, as shown in FIG. 5, that is, the touch driving module and the communication driving module receive and send the respective signals through the coil circuit in the simultaneous manner.

Further, the implementation of the touch sensing function and the NFC function in the simultaneous manner includes that: when the central control module generates the NFC transmission request signal, the central control module keeps the touch driving module to receive and send the touch signals through the coil circuit and controls the communication driving module to send the NFC signal through the coil circuit; when the central control module receives the NFC receiving request signal, the central control module keeps the touch driving module to receive and send the touch signals through the coil circuit and controls the communication driving module to receive the NFC signal through the coil circuit; and when the central control module neither generates the NFC transmission request signal nor receives the NFC receiving request signal, the touch driving module is kept to continuously perform the touch sensing function through the coil circuit.

In this embodiment, in order for a better effect of receiving and sending the signals in the simultaneous manner, the display device also includes a mixer module and a first filter module, and the implementation of the touch sensing function and the NFC function in the simultaneous manner includes that: to send a signal, a sending touch signal generated by the touch driving module and a sending NFC signal generated by the communication driving module are both sent to the mixer module to be mixed with each other to form a mixed signal, which is then applied to the coil circuit for sending; in receiving a signal, the touch driving module receives the mixed signal from the coil circuit as a received touch signal; and the communication driving module receives the mixed signal from the coil circuit and then the mixed signal is subjected to high-pass filtering by the first filter module to obtain a received NFC signal.

It should be noted that, in sending a signal, if there exists the sending touch signal only, the sending touch signal is sent through the coil circuit after passing through the mixer module, thus the mixed signal contains only the sending touch signal; when an NFC transmission request signal is generated by the central control module and is sent to the communication driving module, the communication driving module generates the sending NFC signal after receiving the NFC transmission request signal and sends the generated sending NFC signal to the mixer module, where the sending NFC signal and the sending touch signal are mixed with each other to form a mixed signal, which is then sent to the coil circuit for sending; after the NFC signal is sent, the communication driving module enters to a standby state, and the mixed signal contains only the sending touch signal in this case. The process for receiving the signals is similar to the process for sending the signals, thus is not described in detail herein again.

In this embodiment, the display device may also include a second filter module. In receiving signals, the touch driving module receiving the mixed signal from the coil circuit as a received touch signal may include: in receiving signals, the touch driving module receives the mixed signal from the coil circuit, and the mixed signal is subjected to low-pass filtering by the second filter module to obtain a received touch signal.

Figure 7A:
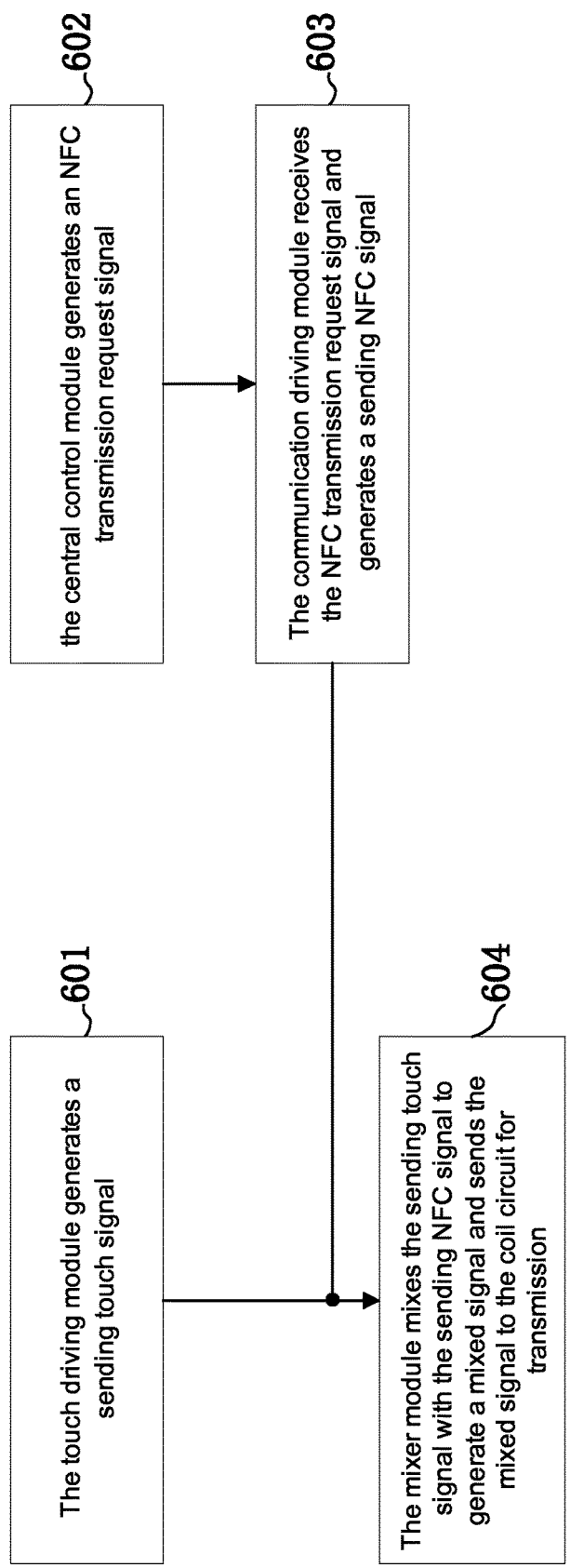
FIG. 7A is a schematic flow chart showing a method for driving a display device according to another embodiment of the present disclosure, where the method is used to send signals in a simultaneous manner.

A specific implementation is taken as an example for further describing the principle of the simultaneous manner mentioned above, which is shown in FIG. 7A, where the method is used to send signals through the simultaneous manner. Referring to FIG. 7A, the method for sending and receiving the touch signal and the NFC signal by the display device includes:

Step 601: the touch driving module generates a sending touch signal;

Step 602: the central control module generates an NFC transmission request signal;

Step 603: the communication driving module receives the NFC transmission request signal and generates a sending NFC signal; and Step 604: the mixer module mixes the sending touch signal with the NFC transmission request signal together to generate a mixed signal, which is then sent to the coil circuit for sending.

Figure 7B:
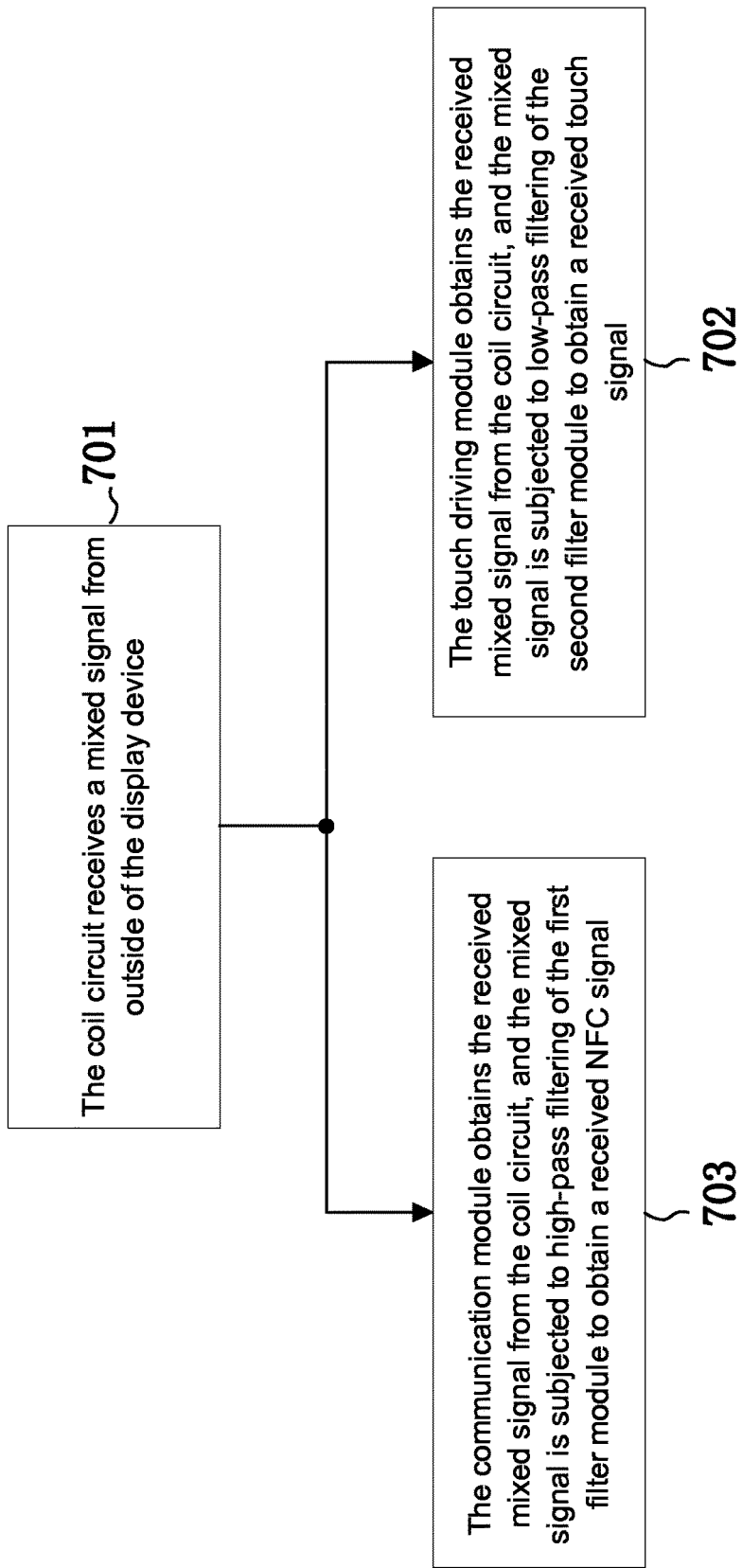
FIG. 7B a schematic flow chart showing a method for driving a display device according to another embodiment of the present disclosure, where the method is used to receive signals in a simultaneous manner.

FIG. 7B is a schematic flow chart showing a method for driving a display device according to this embodiment of the present disclosure, where the display device is used to receive signals through the simultaneous manner. Referring to FIG. 7B, the method for receiving the touch signal and the NFC signal simultaneously includes:

Step 701: the coil receives a mixed signal from outside of the display device, it should be noted that the mixed signal is obtained from mixing the touch signal with the NFC signal together, where the touch signal and the NFC signal are send by external device(s) with the corresponding functions outside the display device.

Step 702: the touch driving module receives the mixed signal from the coil circuit, where the received mixed signal is subjected to low-pass filtering by the second filter module to obtain a received touch signal; and Step 703: the communication driving module obtains the received mixed signal from the coil circuit, and the obtained mixed signal is subjected to low-pass filtering by first filter module to obtain a received NFC signal.

It should be noted that if the mixed signal obtained from mixing the touch signal with the NFC signal together is received via the coil circuit, Steps 702 and 703 are performed simultaneously.

According to the method for driving the display device provided in this embodiment, the touch signal and the NFC signal are received and sent through the coil circuit in the simultaneous manner, and the corresponding modules are arranged in the display device as actually required, so that the electromagnetic interference between the touch signal and the NFC signal can be avoided, thereby the accuracy and the precision of the touch signal and the NFC signal are increased correspondingly.

As can be seen, the embodiments described above are preferable but not intended to limit the present disclosure in any way. Although the present disclosure has been described as above in combination with the preferable embodiments, the disclosure is not limited to these embodiments. Various modifications and variations may be made on the technical solutions of the present disclosure by those skilled in the art in light of the methods and other technical contents described above without departing from the scope of the disclosure, or equivalent embodiments with equivalent modifications may be obtained. Thus, any simple modifications, equivalent variations and modifications made to the embodiments based on the essence of the technical solution without departing the scope of the technical solutions of the present disclosure are intended to fall within the scope of this disclosure.

What is claimed is:

1. A display device, comprising:
a touch driving module, configured to cause the display device to perform a touch sensing function;
a communication driving module, configured to cause the display device to perform a Near Field Communication (NFC) function, the touch sensing function and the NFC function are performed in a time division manner; and
a coil circuit;
wherein the touch driving module is further configured to receive and send a touch signal via the coil circuit, and
wherein the communication driving module is further configured to receive and send an NFC signal via the coil circuit;
wherein the coil circuit comprises:
a plurality of first oriented coil circuits; and
a plurality of second oriented coil circuits intersecting and electrically insulated from the first oriented coil circuits,
wherein a first end of each of the plurality of first oriented coil circuits and a first end of each of the plurality of second oriented coil circuits are electrically connected to the touch driving module,
wherein at least one of the plurality of first oriented coil circuits and the plurality of second coil circuits has a first end hardwired connected to the communication driving module, and
wherein a second end of the each of the plurality of first oriented coil circuits and a second end of the each of the plurality of second coil circuits are grounded.

2. The display device of claim 1, wherein,
the input terminal of the communication driving module is hardwired connected with at least one of the plurality of first oriented coil circuits and the output terminal of the communication driving module is hardwired connected with at least one of the plurality of second oriented coil circuits, or the input terminal of the communication driving module is hardwired connected with at least one of the plurality of second oriented coil circuits and the output terminal of the communication driving module is hardwired connected with at least one of the plurality of second oriented coil circuits.

3. The display device of claim 1, wherein the coil circuit is electromagnetic touch sensing, or is electromagnetism and capacitance integrated touch sensing, or is grounded in capacitive touch sensing.

4. The display device of claim 1, further comprising a central control module, configured to cause the touch driving module and the communication driving module to receive and send the touch signal and the NFC signal through the coil circuit, respectively.

5. The display device of claim 4, wherein:
to send the NFC signal, the central control module is configured to:
generate an NFC transmission request signal, and
send the NFC transmission request signal to the communication driving module, and
to receive the NFC signal, the communication driving module is configured to:
generate an NFC receiving request signal, and send the NFC receiving request signal to the central control module.

6. The display device of claim 5, wherein:
the touch driving module is configured to scan the coil circuit in a first frequency to detect whether the touch signal exists in the coil circuit; and
the communication driving module is configured to scan the coil circuit in a second frequency to detect whether the NFC signal exists in the coil circuit,
wherein the first frequency is higher than the second frequency.

7. The display device of claim 6, wherein the first frequency is 19 or more times greater than the second frequency.

8. The display device of claim 5, wherein:
the central control module is configured to:
when generating the NFC transmission request signal, stop the receiving and sending of the touch signal by the touch driving module,
control the communication driving module to send the NFC signal through the coil circuit, and
after the NFC signal is sent, resume the touch sensing function performed by the touch driving module through the coil circuit;
the central control module is further configured to:
when receiving the NFC receiving request signal,
stop the receiving and sending of the touch signal by the touch driving module,
control the communication driving module to receive the NFC signal through the coil circuit, and
after the NFC signal is received, resume the touch sensing function performed by the touch driving module through the coil circuit; and
when the central control module neither generates the NFC transmission request signal nor receives the NFC receiving request signal, the touch driving module continuously performs the touch sensing function through the coil circuit.

9. The display device of claim 5,
wherein the central control module is configured to:
when generating the NFC transmission request signal:
control the touch driving module to keep receiving and sending the touch signal through the coil circuit, and
control the communication driving module to send the NFC signal through the coil circuit;
when receiving the NFC receiving request signal:
control the touch driving module to keep receiving and sending the touch signal through the coil circuit, and
control the communication driving module to receive the NFC signal through the coil circuit; and
when the central control module neither generates the NFC transmission request signal nor receives the NFC receiving request signal, the touch driving module continuously performs the touch sensing function through the coil circuit.

10. The display device of claim 9, further comprising a mixer module, configured to, when the display device is to send a signal:
mix a sending touch signal with a sending NFC signal together to generate a mixed signal, and
apply the mixed signal to the coil circuit.

11. The display device of claim 9, further comprising a first filter module, configured to, when a mixed signal is received by the display device:
conduct high-pass filtering on the received mixed signal to obtain a received NFC signal, and send the obtained received NFC signal to the communication driving module,
wherein the received mixed signal is further sent to the touch driving module as a received touch signal.

12. The display device of claim 11, further comprising a second filter module, configured to, when a mixed signal is received by the display device:
conduct low-pass filtering on the received mixed signal to obtain a received touch signal, and
subsequently send the received touch signal to the touch driving module.

13. The display device of claim 1, wherein,
the communication driving module is hardwired connected to at least one of the plurality of first oriented coil circuits and not connected to the plurality of second oriented coil circuits; or
the communication driving module is hardwired connected to at least one of the plurality of second oriented coil circuits and not connected to the plurality of first oriented coil circuits.

14. A method for driving a display device,
wherein the display device comprises a touch driving module, configured to cause the display device to perform a touch sensing function; a communication driving module, configured to cause the display device to perform a Near Field Communication (NFC) function, wherein the touch sensing function and the NFC function are performed in a time division manner; and
wherein the display device further comprises a coil circuit, wherein the touch driving module are further configured to receive and send a touch signal via the coil circuit and the communication driving module are further configured to receive and send an NFC signal via the coil circuit, respectively,
the method comprising:
receiving and sending the touch signal by the touch driving module through the coil circuit to perform the touch sensing function; and
receiving and sending the NFC signal by the communication driving module through the coil circuit to perform the NFC function;
wherein the coil circuit comprises:
a plurality of first oriented coil circuits; and
a plurality of second oriented coil circuits intersecting and electrically insulated from the first oriented coil circuits,
wherein a first end of each of the plurality of first oriented coil circuits and a first end of each of the plurality of second oriented coil circuits are electrically connected to the touch driving module,
wherein at least one of the plurality of first oriented coil circuits and the plurality of second coil circuits has an end hardwired to the communication driving module, and
a second end of the each of the plurality of first oriented coil circuits and a second end of the each of the plurality of second coil circuits are grounded.

15. The method of claim 14, wherein the display device further comprises a central control module, configured to control the touch driving module and the communication driving module to receive and send signals through the coil circuit, respectively.

16. The method of claim 15, wherein:
to send the NFC signal, the central control module is configured to generate an NFC transmission request signal and is configured to send the NFC transmission request signal to the communication driving module, and to receive the NFC signal, the communication driving module is configured to generate an NFC receiving request signal and to send the NFC receiving request signal to the central control module.

17. The method of claim 16, wherein, the touch sensing function and the NFC function are performed in a simultaneous manner.

18. The method of claim 17, wherein, the touch sensing function and the NFC function are performed in the time division manner, during which:
the touch driving module scans the coil circuit in a first frequency to detect whether the touch signal exists in the coil circuit, and
the communication driving module scans the coil circuit in a second frequency to detect whether the NFC signal exists in the coil circuit,
wherein the first frequency is higher than the second frequency.

19. The method of claim 18, wherein the first frequency is 19 or more times greater than the second frequency.

20. The method of claim 17, wherein the touch sensing function and the NFC function are performed in the time division manner, during which:
when the central control module generates an NFC transmission request signal, the central control module:
stops the receiving and sending of the touch signal by the touch driving module,
controls the communication driving module to send the NFC signal through the coil circuit, and
after the NFC signal is sent, resumes the touch sensing function performed by the touch driving module through the coil circuit;
when the central control module receives an NFC receiving request signal, the central control module:
stops the receiving and sending of the touch signal by the touch driving module,
controls the communication driving module to receive the NFC signal through the coil circuit, and
after the NFC signal is received, resumes the touch sensing function performed by the touch driving module through the coil circuit; and
when the central control module neither generates the NFC transmission request signal nor receives the NFC receiving request signal, the central control module causes the touch driving module to continuously perform the touch sensing function through the coil circuit.

21. The method of claim 17, wherein the touch sensing function and the NFC function are performed in the simultaneous manner, during which:
the central control module:
when the central control module generates an NFC transmission request signal:
controls the touch driving module to keep receiving and sending the touch signal through the coil circuit, and
controls the communication driving module to send the NFC signal through the coil circuit;
when the central control module receives an NFC receiving request signal:
controls the touch driving module to keep receiving and sending the touch signal through the coil circuit, and
controls the communication driving module to receive the NFC signal through the coil circuit; and
when the central control module neither generates the NFC transmission request signal nor receives the NFC receiving request signal, causes the touch driving module to continuously perform the touch sensing function through the coil circuit.

22. The method of claim 21, wherein the display device further comprises a mixer module and a first filter module, and the touch sensing function and the NFC function are performed in the simultaneous manner, during which:
to send a signal:
the touch driving module delivers a sending touch signal generated by the touch driving module to the mixer module, and
the communication driving module delivers a sending NFC signal generated by the communication driving module to the mixer module to mix the sending touch signal with the sending NFC signal to generate a mixed signal;
the mixed signal is applied by the mixer module to the coil circuit for transmission;
when a mixed signal is received, the touch driving module obtains the received mixed signal from the coil circuit as a received touch signal;
the communication driving module obtains the received mixed signal from the coil circuit; and
high-pass filtering is performed on the mixed signal by the first filter module to obtain a received NFC signal.

23. The method of claim 22, wherein:
the display device further comprises a second filter module;
the touch driving module obtaining the received mixed signal from the coil circuit comprises:
conducting low-pass filtering on the mixed signal by the second filter module to obtain the received touch signal.

* * * * *